United States Patent [19]
Ferri

[11] Patent Number: 5,816,135
[45] Date of Patent: Oct. 6, 1998

[54] METHOD AND APPARATUS FOR SELECTIVELY DISPENSING HOT WATER OR HOT BEVERAGES

[75] Inventor: John G. Ferri, Charlotte, N.C.

[73] Assignee: Mary Louise Ferri, Charlotte, N.C.

[21] Appl. No.: 788,859

[22] Filed: Jan. 23, 1997

[51] Int. Cl.[6] .................................................. A47J 31/00
[52] U.S. Cl. ................................ 99/290; 99/295; 99/315; 99/307; 99/279; 222/146.2
[58] Field of Search ............................. 99/307, 279, 312, 99/302 R, 315, 290, 295; 222/146.2, 146.5

[56] References Cited

U.S. PATENT DOCUMENTS

| | | | |
|---|---|---|---|
| 4,139,761 | 2/1979 | Obrowski | 99/307 X |
| 4,757,752 | 7/1988 | Robins et al. | 99/307 X |
| 4,757,754 | 7/1988 | Welker | 99/307 |

*Primary Examiner*—Reginald L. Alexander
*Attorney, Agent, or Firm*—Clifton Ted Hunt

[57] ABSTRACT

The invention comprises a tankless water heater combined with a beverage brewing/dispenser, whereby the user may selectively dispense either hot water or a heated beverage of the user's choice.

4 Claims, 7 Drawing Sheets

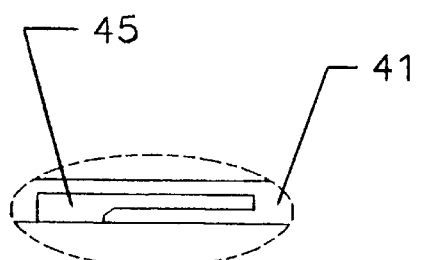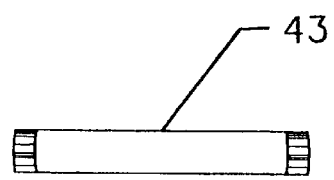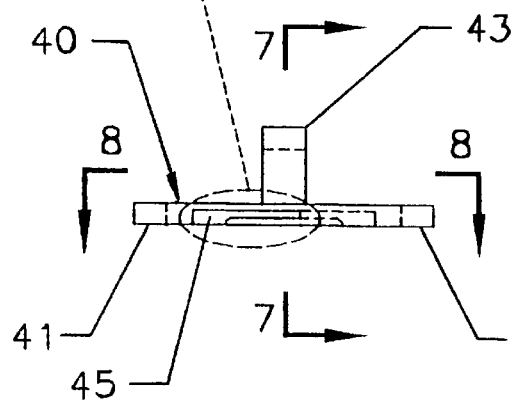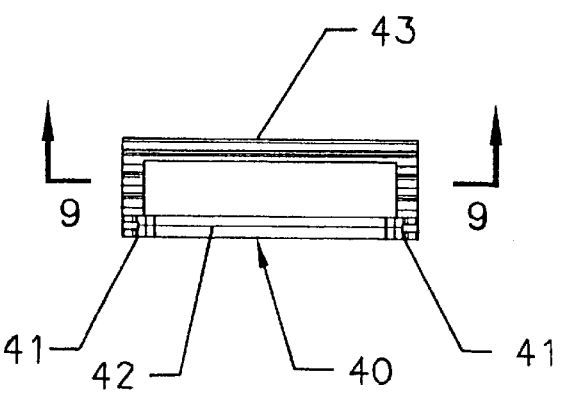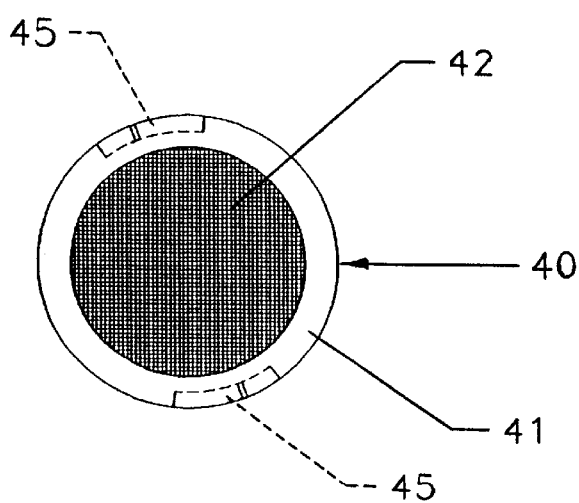

METHOD AND APPARATUS FOR SELECTIVELY DISPENSING HOT WATER OR HOT BEVERAGES

FIELD OF THE INVENTION

This invention relates to the provision of an instant hot water system of the type used at household sinks combined with a beverage brewing/dispensing unit for the user to selectively dispense either an instantly brewed hot beverage or instant hot water.

BACKGROUND OF THE INVENTION

Continuous flow or "tankless" water heaters wherein the water is almost instantly heated as it passes through a continuous flow system are known for both commercial and domestic use. See, for example, Pat. No. 5,408,578 issued Apr. 18, 1995 to Bolivar for TANKLESS WATER HEATER ASSEMBLY and the several patents cited in the Description of the Prior Art in the Bolivar patent. Apparatus for brewing specific beverages are also known. See for example Pat. No. 4,386,556 to Romey, Sr. for COFFEE MAKER WITH INSULATED DISPENSING CONTAINER and Pat. No. 5,305,924 to Groover, et al. For BEVERAGE DISPENSER.

To applicant's knowledge, apparatus for brewing different beverages selected by the user has not heretofore been combined with a continuous flow or tankless water heater of the type conventionally used with household sinks.

SUMMARY OF THE INVENTION

The invention comprises a tankless water heater combined with a beverage brewing/dispenser, whereby the user may selectively dispense either hot water or a heated beverage of the user's choice.

The beverage/brewing dispenser comprises a beverage housing, a filter cartridge, a faucet and an actuator or control valve. When the beverage/brewing dispenser is operatively connected to the tankless water heater, a user may dispense either plain hot water as before, or a freshly brewed beverage.

BRIEF DESCRIPTION OF THE DRAWINGS

FIG. 6 is a side elevation of the top of the filter cartridge;

FIG. 7 is a sectional view that is taken substantially along the line 7—7 in FIG. 6;

FIG. 8 is a sectional view that is taken substantially along the line 8—8 in FIG. 6;

FIG. 9 is a sectional view that is taken substantially along the line 9—9 in FIG. 7;

DETAILED DESCRIPTION OF THE INVENTION

Figure 1:
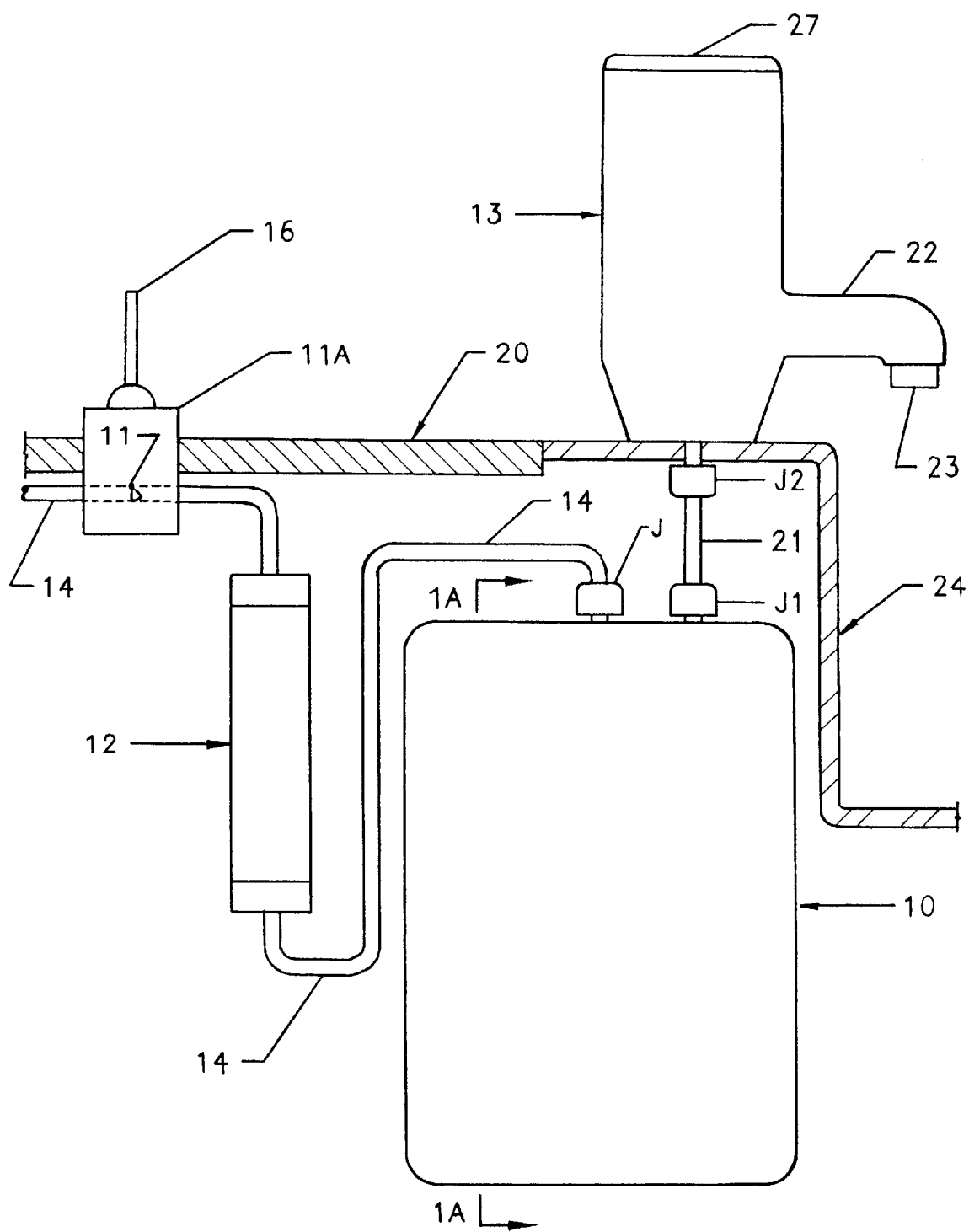
FIG. 1 is a somewhat schematic side elevation of the heating and brewing apparatus.

Referring more specifically to the drawings, the invention comprises an electric or electronic tankless water heater 10, a control valve 11 within a housing 11A, an in line water filter 12 between the housing 11A and the water heater 10, and a beverage housing 13 above the water heater 10, as shown in FIG. 1.

A pipe 14 conveys household water through the housing 11A, through the in line filter 12 and into the tankless water heater 10. The control valve 11 in the control valve housing 11A is manually controlled by an actuating handle 16 on top of the housing 11A.

In the illustrated embodiment, the water line 14, filter 12 and water heater 10 are disposed beneath a kitchen counter 20. The control valve housing 11A extends through the counter 20 with the control valve 11 in the water line beneath the counter and the handle 16 above the counter 20. The beverage housing 13 is on top of the counter 20 and a water pipe 21 provides communication between the tankless water heater 10 beneath the counter and the beverage housing 13 above the counter.

Figure 1A:
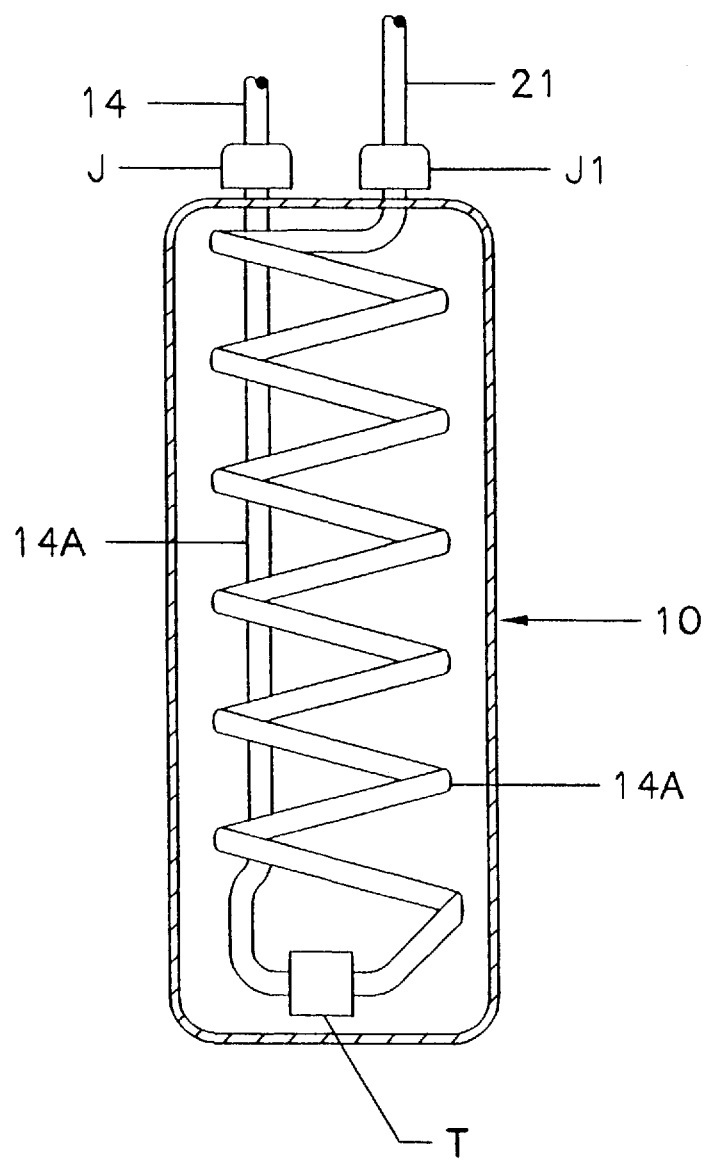
FIG. 1A is a sectional view that is taken substantially along the line 1A—1A in the tankless water heater of FIG. 1.

The tankless water heater 10 is illustrated as comprising a coil of water pipe 14A connected to the water line 14 with a compression fitting, as at J in FIG. 1A. A thermostat T is at the bottom of the heater 10 and activates a suitable heating system, not shown, when household water enters the heater 10 through the water line 14. The heating system is conventional and not part of this invention. A heating system such as disclosed in Pat. No. 4,513,887 to Wicke, et al. is a satisfactory example of a suitable heating system. The water is heated to a temperature of 180° 190° F. as it leaves the heater 10 through a pipe 21 connected to the heater 10 by a compression pipe fitting $J^1$ at the top of the heater 10. The pipe 21 is also connected by a compression pipe fitting $J^2$ to the bottom of the beverage housing 13.

The beverage housing 13 has an inner cavity 25 with an inverted frusto-conical configuration that houses a filter cartridge 26. The filter cartridge 26 supports a conventional granulated beverage such as coffee, tea or cocoa, of the user's selection. The granulated beverage may be put in the filter cartridge by spoon or in a package, such as a conventional tea bag or coffee bag.

Figure 2:
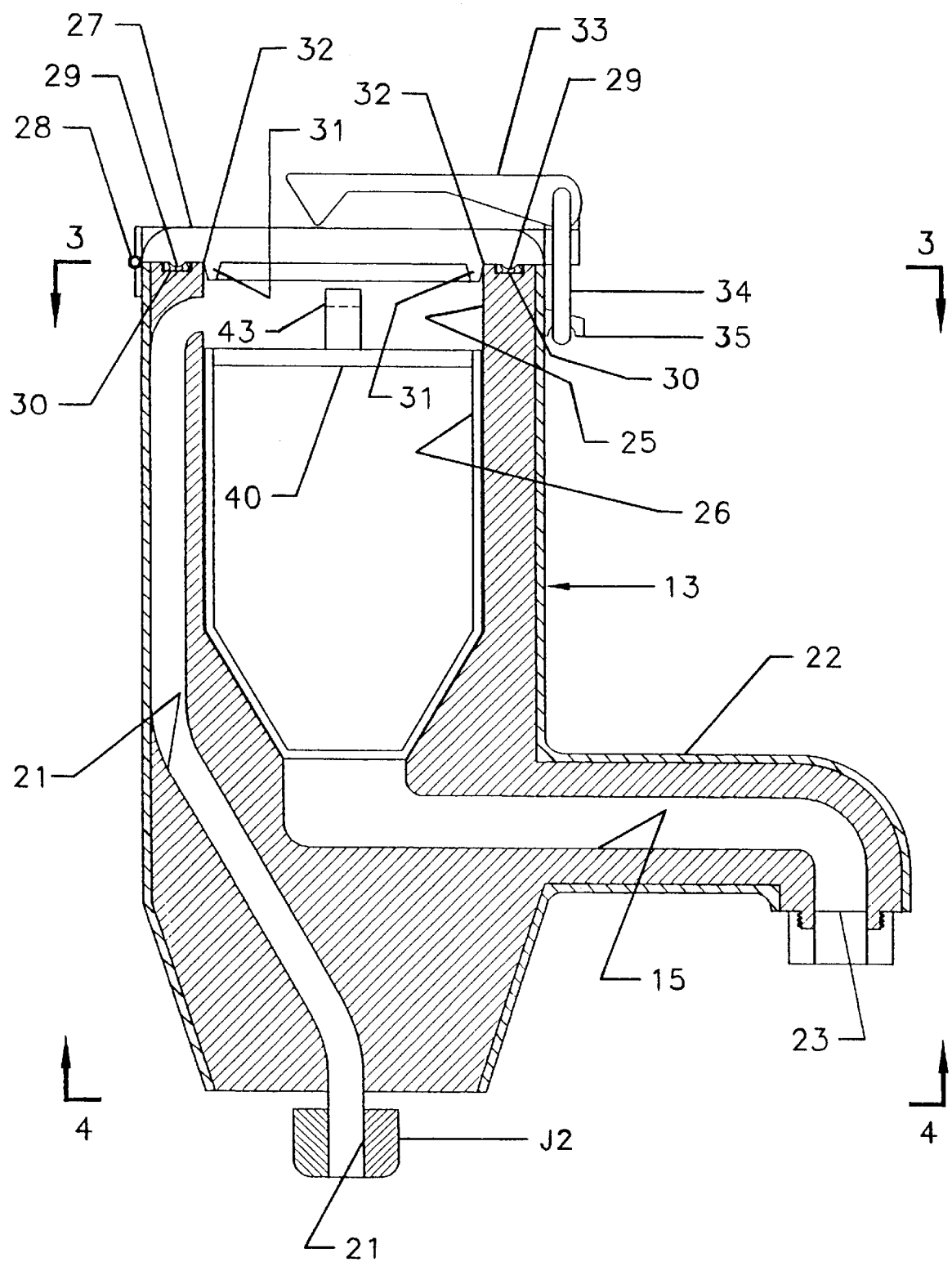
FIG. 2 is a sectional view of the beverage housing and faucet.

The open top of the beverage housing 13 is closed by a cover 27 that is hinged near the upper edge of the housing, as at 28. The cover 27 conforms with the circular shape of the unit 13. The upper wall of the beverage housing 13 has an annular groove housing a gasket 30 (FIG. 2). An annular rib 29 seats against the gasket 30 to prevent leakage when the cover is closed. An annular rib 31 on the inner surface of the cover 27 is spaced inwardly from the edge of the cover. The annular rib 31 seats against the wall of the cavity 25, as at 32, for sealing engagement when the cover is in the closed position of FIG. 2. The cover is clamped in its closed position by a handle 33 connected by a link 34 to an anchor 35 on the wall of the unit 13 opposite the hinge 28.

In practice, the cover 27 is moved to its closed position by rotating it about its hinge 28 with the handle 33 and link 34 disengaged from the anchor 35. The handle 33 is cammed to the right in FIG. 2 to place the link 34 beneath the anchor 35. The handle 33 is then rotated to the left and to its clamping position of FIG. 2, where the link 34 is raised into snug engagement with the anchor 35 and the cover 27 is sealed tight against the wall of the cavity 25, as at 32.

A faucet 22 extends laterally from the beverage housing 13 and beyond the proximate edge of the counter 20. The faucet 22 terminates in a downwardly extending opening 23, overlying a sink 24. A tube 15 extends between the lower end of the inverted frusto-conical cavity 25 and the open end 23 of the faucet 22.

Figure 3:
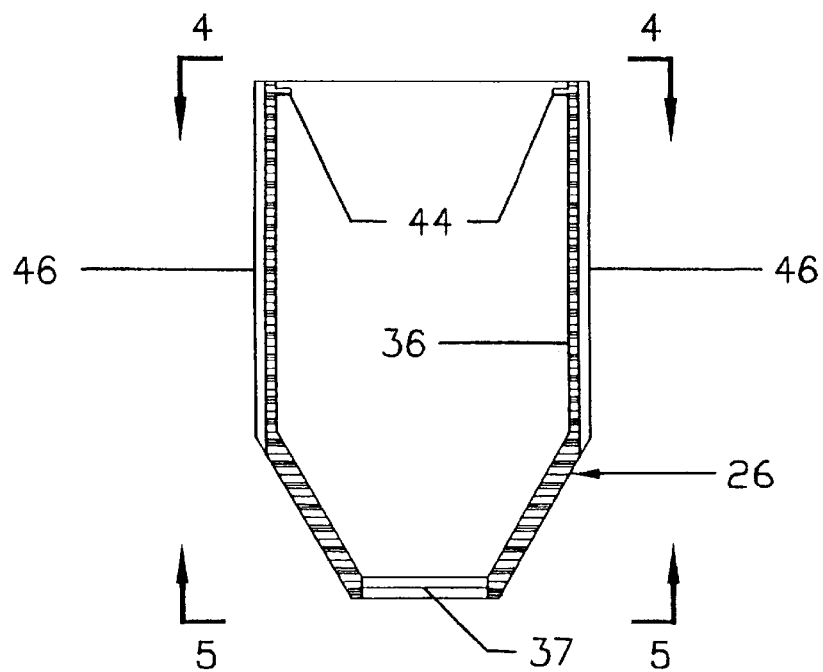
FIG. 3 is a vertical sectional view of the filter cartridge, omitting the top.

The reusable filter cartridge 26 is illustrated in FIGS. 2–9. As seen in FIG. 3, the filter cartridge 26 has the same inverted frusto-conical configuration as the cavity 25 in the beverage housing 13. The filter cartridge 26 includes a tubular wall 36, preferably made of plastic. A suitable metal screen 37 extends across the lower end of the filter cartridge, and a removable top 40 (FIG. 11) is on the open upper end of the filter cartridge.

The top 40 comprises an annular rim 41 encasing a circular metal screen 42. A handle 43 extends upwardly from opposite sides of the rim 41 (FIGS. 7 and 9) and is spaced above the screen 42 (FIG. 7).

Figure 4:
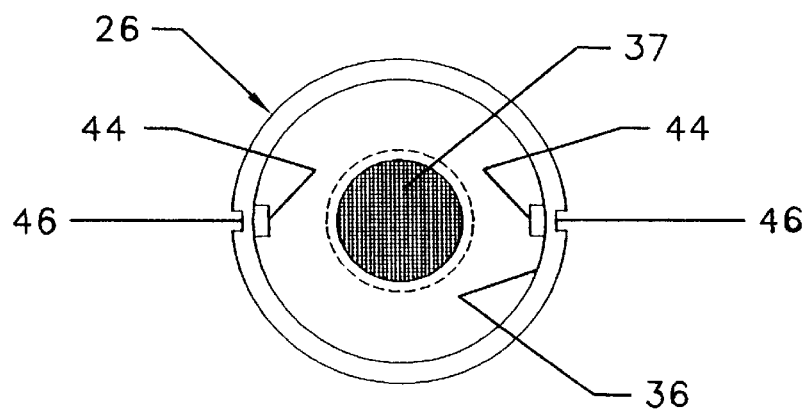
FIG. 4 is a sectional view that is taken substantially along the line 4—4 in FIG. 3.
Figure 5:
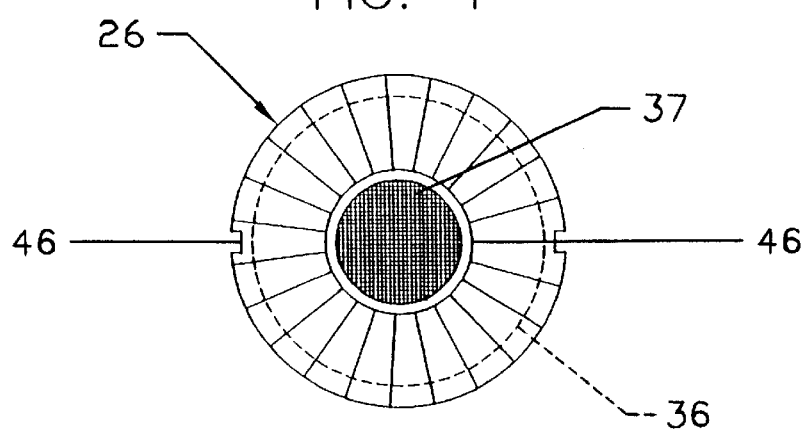
FIG. 5 is a sectional view that is taken substantially along the line 5—5 in FIG. 3.
Figure 10:
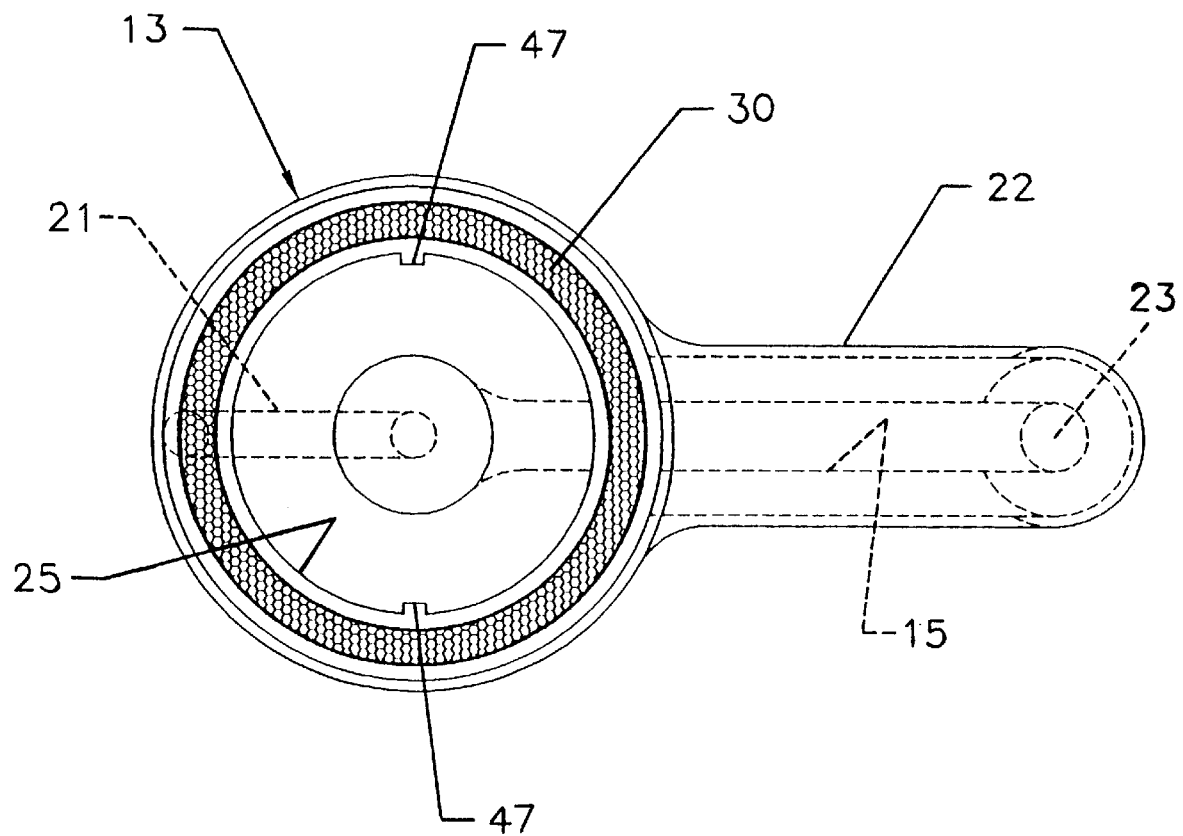
FIG. 10 is a plan view of the beverage housing and faucet, omitting the filter cartridge.

Oppositely disposed lugs 44 extend inwardly toward each other near the upper edge of the filter chamber 36 (FIGS. 3 and 4). The rim 41 on the top 40 has L-shaped cutouts 45 that register with the lugs 44 to lock the top 40 on the filter cartridge in use. The outer wall of the filter chamber 26 has vertical grooves 46 opposite the lugs 44 (FIG. 3) to receive lugs 47 on the inner wall of cavity 25 (FIG. 10). The lugs 47 guide the filter chamber 26 into proper position within the cavity 25 each time the filter chamber is placed in the cavity 25 to brew a beverage.

OPERATION

Figure 11:
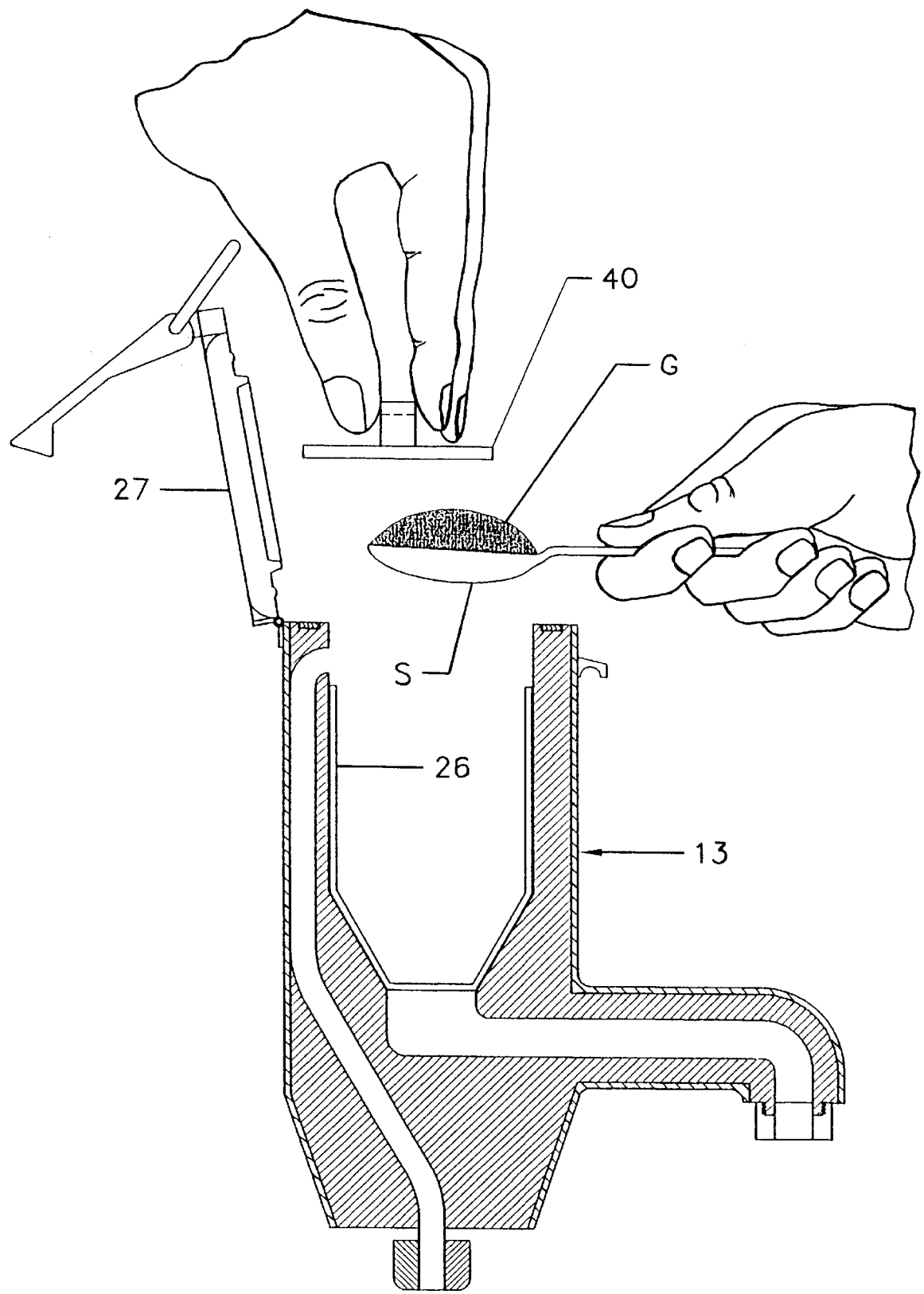
FIG. 11 is a sectional view of the beverage housing illustrating the placing of granules of a desired beverage in the filter cartridge.

If a user wants to enjoy a heated beverage, granules to form the beverage of choice are placed in the filter cartridge 26. This may be done by removing the filter top 40 and depositing by spoon S granules G of the desired beverage into the filter cartridge, as shown in FIG. 11. Alternatively, pre-packaged granules of the desired beverage may be placed in the filter cartridge after removing the top 40.

The top is closed and actuating handle 16 is then manipulated to open the control valve 11 in the water line 14. This admits household water to the heater 10 and activates the thermostat T in the bottom of the heater. The thermostat, in turn activates the heating element to heat the water as it passes through the heater 10. The heated water rises through the pipe 21 to the beverage housing 13, passes through the granules in the filter cartridge 26 and the freshly brewed beverage of choice exits through the faucet 22. The filter cartridge 26 is preferably removed from the cavity 25 after each use to be cleaned for its next use.

If a user wants to use plain hot water for any purpose, all that need be done is to leave the filter cartridge empty and manipulate the actuating handle 16 to open the control valve 11 in the water line 14 to heat the water and cause it to pass through the empty filter cartridge, and out the faucet 22.

CONCLUSION

There is thus provided an apparatus for selectively and efficiently dispensing a freshly brewed beverage or plain hot water, as desired. Although specific terms have been used in describing the invention, they have been used in a generic and descriptive sense only and not for the purpose of limitation, the scope of the invention being defined by the following claims to invention.

I claim:

1. In a tankless water heater for heating a continuous flow of water coming through a pipe extending from a supply of water and having an outlet for the heated water, the combination of a beverage/brewer including:
   a beverage housing having a cavity of an inverted frusto-conical configuration;
   a filter cartridge including:
      a tubular wall having a configuration conforming with the cavity in the beverage housing;
      a metal screen across the bottom of the filter cartridge; and
      means for communicatively connecting the beverage/brewer to the outlet for the heated water.

2. The invention of claim 1 wherein a cover is provided on top of the beverage housing, means for opening the cover for access to the filter cartridge, and means for clamping the cover to the beverage housing to prevent leakage.

3. The invention of claim 1 wherein a removable top is provided for the upper end of the filter cartridge, said top comprising a circular metal screen, an annular rim encasing the metal screen, a handle extending upwardly from opposite sides of the rim, and means for locking the top to the filter cartridge.

4. In a tankless water heater for heating a continuous flow of water coming through a pipe extending from a supply of water and having an outlet for the heated water, the combination of a beverage/brewer including:
   a beverage housing having a cavity of an inverted frusto-conical configuration and including:
      a faucet and a control valve;
      a tube extending between the cavity and the faucet;
      a filter cartridge; and
      means for communicatively connecting the beverage/brewer to the outlet for the heated water.

* * * * *